(12) United States Patent
Sadakane

(10) Patent No.: US 10,996,468 B2
(45) Date of Patent: May 4, 2021

(54) LAMINATED GLASS

(71) Applicant: AGC Inc., Chiyoda-ku (JP)

(72) Inventor: Shunsuke Sadakane, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 117 days.

(21) Appl. No.: 15/984,694

(22) Filed: May 21, 2018

(65) Prior Publication Data

US 2018/0267308 A1 Sep. 20, 2018

Related U.S. Application Data

(63) Continuation of application No. PCT/JP2016/084493, filed on Nov. 21, 2016.

(30) Foreign Application Priority Data

Nov. 24, 2015 (JP) .............................. JP2015-228630

(51) Int. Cl.
*G02B 27/01* (2006.01)
*B32B 17/10* (2006.01)
*B60J 1/00* (2006.01)

(52) U.S. Cl.
CPC .... *G02B 27/0101* (2013.01); *B32B 17/10036* (2013.01); *B32B 17/10082* (2013.01); *B32B 17/10568* (2013.01); *B32B 17/10761* (2013.01); *B60J 1/001* (2013.01); *G02B 27/01* (2013.01); *B32B 17/10073* (2013.01); *B60J 1/00* (2013.01);

(Continued)

(58) Field of Classification Search
None
See application file for complete search history.

(56) References Cited

U.S. PATENT DOCUMENTS

| | | |
|---|---|---|
| 5,812,332 A | 9/1998 | Freeman |
| 2002/0008926 A1 | 1/2002 | Freeman |

(Continued)

FOREIGN PATENT DOCUMENTS

| | | |
|---|---|---|
| CN | 1642866 A | 7/2005 |
| JP | 07-175007 | 7/1995 |

(Continued)

OTHER PUBLICATIONS

International Search Report dated Jan. 10, 2017 in PCT/JP2016/084493 filed Nov. 21, 2016 (with English Translation).

(Continued)

*Primary Examiner* — Robert E. Tallman
(74) *Attorney, Agent, or Firm* — Oblon, McClelland, Maier & Neustadt, L.L.P.

(57) ABSTRACT

A laminated glass includes a first glass plate; a second glass plate; and an intermediate film positioned between the first glass plate and the second glass plate, and configured to be bonded to the first glass plate and the second glass plate. The laminated glass further includes an HUD (head-up display) display area used for a head-up display. In a predetermined area of at least a part of the HUD display area, a wedge angle decreases, in accordance with a direction front a lower edge of the predetermined area to an upper edge of the predetermined area, within a range of greater than or equal to 0.06 mrad and less than or equal to 1.0 mrad per 100 mm.

20 Claims, 6 Drawing Sheets

(52) U.S. Cl.
CPC ............... *G02B 2027/0121* (2013.01); *G02B 2027/0194* (2013.01)

(56) References Cited

U.S. PATENT DOCUMENTS

| | | |
|---|---|---|
| 2003/0215610 A1 | 11/2003 | DiGiampaolo et al. |
| 2004/0109251 A1 | 6/2004 | Freeman |
| 2005/0158520 A1 | 7/2005 | Freeman |
| 2010/0314900 A1* | 12/2010 | Labrot .............. B32B 17/10036 296/90 |
| 2016/0291324 A1 | 10/2016 | Arndt et al. |
| 2017/0072663 A1 | 3/2017 | Sadakane et al. |

FOREIGN PATENT DOCUMENTS

| | | |
|---|---|---|
| JP | 2009-035444 | 2/2009 |
| JP | 2011-505330 | 2/2011 |
| JP | 2011-207645 | 10/2011 |
| WO | WO 2015/086233 A1 | 6/2015 |
| WO | WO 2016/017566 A1 | 2/2016 |

OTHER PUBLICATIONS

Written Opinion dated Jan. 10, 2017 in PCT/JP2016/084493 filed Nov. 21, 2016.

* cited by examiner

LAMINATED GLASS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/084493 filed on Nov. 21, 2016 and designating the U.S., which claims priority of Japanese Patent Application No. 2015-228630 filed on Nov. 24, 2015. The entire contents of the foregoing applications are incorporated herein by reference.

BACKGROUND OF THE INVENTION

1. Field of the Invention

The disclosure herein generally relates to a laminated glass.

2. Description of the Related Art

In recent years, head-up displays (in the following, referred to as an "HUD") have become more and more popular. In a head-up display, an image is reflected on a front windshield of a vehicle so that predetermined information is displayed in a driver's view. However, for driver viewing of a view outside the vehicle or of the information displayed by the HUD, there may be a case where a double image is a problem.

A double image that becomes a problem for a driver of a vehicle includes a transmitted double image and a reflected double image. When the front windshield includes a HUD display area used for the HUD and an area outside the HUD display area (transparent area) that is not used for the HUD, although a transmitted double image may be a problem in the HUD display area, generally a reflected double image is the main problem; and, in the area outside the HUD display area, a transmitted double image is a problem.

It has been known that such reflected double image or transmitted double image can be reduced by using, for a front windshield, a laminated glass having a shape of a wedge. For example, a laminated glass obtained by holding with two glass plates an intermediate film to have a shape of a wedge as a whole has been proposed (See, for example, Japanese Unexamined Patent Application Publication No. H07-175007).

SUMMARY OF THE INVENTION

Technical Problem

In the HUD, the front windshield is irradiated, with an emitted light from a light source via a concave mirror. At this time, by rotating the concave mirror in accordance with a height of a driver's eye, a display position of a virtual image is adjusted vertically. In the conventional front windshield, there is a problem that in the case where the concave mirror is rotated in accordance with a vertical motion of a position of the driver's eye point, the reflected double image degrades.

The present invention was made in view of such a problem, and it is an object of the present invention to provide a laminated glass having a wedge angle, in which even when the concave mirror is rotated in accordance with the vertical motion of the position of the driver's eye point, a reflected double image is more controllable than the conventional front windshield.

Solution to Problem

According to an aspect of the present invention, a laminated glass includes a first glass plate; a second glass plate; and an intermediate film positioned between the first glass plate and the second glass plate and configured to be bonded to the first glass plate and the second glass plate. The laminated glass further includes an HUD display area used for a head-up display. In a predetermined area of at least a part of the HUD display area, a wedge angle decreases, in accordance with a direction from a lower edge of the predetermined area to an upper edge of the predetermined area, within a range of greater than or equal to 0.06 mrad and less than or equal to 1.0 mrad per 100 mm.

Advantageous Effect of Invention

According to an aspect of the present invention, a laminated glass having a wedge angle, in which even when a concave mirror is rotated in accordance with a vertical motion of a position of a driver's eye point, a reflected double image is more controllable than a conventional front windshield.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1A:
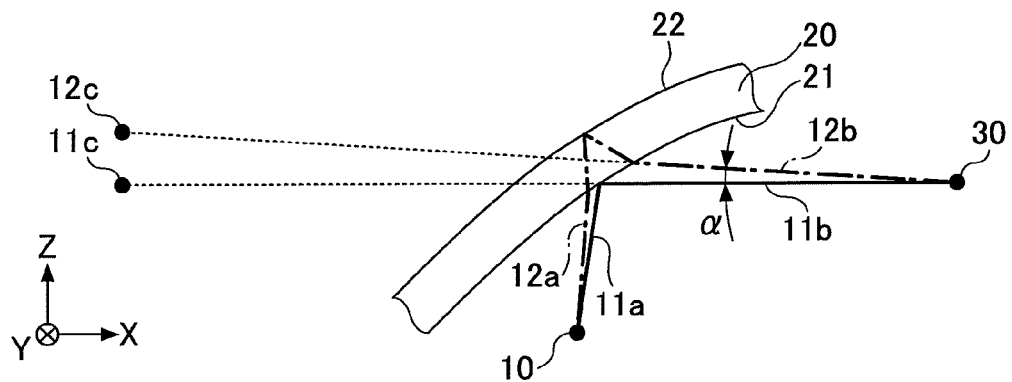
FIGS. 1A and 1B are diagrams for explaining a concept of a double image.

In the following, with reference to drawings, embodiments of the present invention will be described. In each drawing, the same reference numeral is assigned to the same component, and redundant explanation will be omitted. In the following, a front windshield of a vehicle will be described as an example, but the present indention is not limited to this, and the laminated glass according to the embodiment can also be applied to other than the front windshield of the vehicle.

[Reflected Double Image, Transmitted Double Image]

Figure 1B:
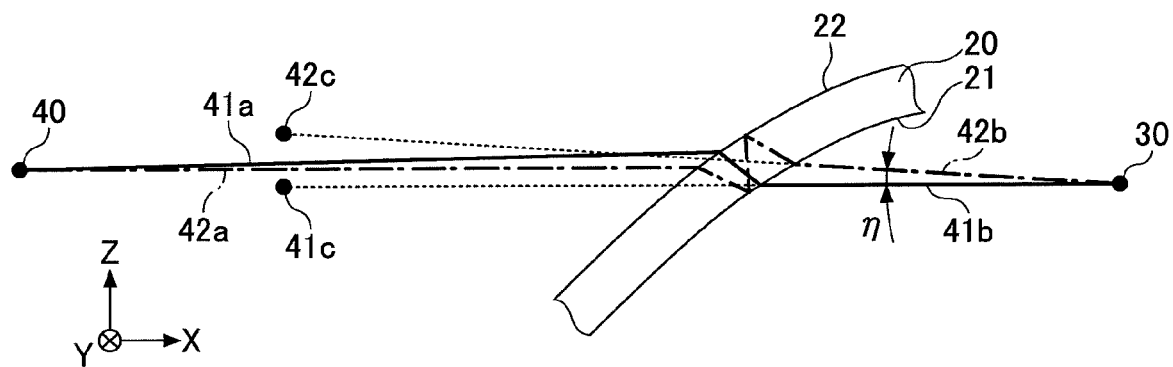

First, concepts of a reflected double image and a transmitted double image will be described. FIGS. 1A and 1B are diagrams for explaining a concept of a double image. FIG. 1A illustrates a reflected double image, and FIG. 1B illustrates a transmitted double image. In FIGS. 1A and 1B, a front-back direction of a vehicle in which the front windshield 20 is installed is the X-direction, a left-right direction of the vehicle is the Y-direction, and a direction perpendicular to an XY-plane is the Z-direction (The same applies to subsequent drawings).

As illustrated in FIG. 1A, a part of light beam 11a emitted from a light source 10 of HUD is reflected on an interior surface 21 of the front windshield 20 of the vehicle, and guided to an eye 30 of a driver as a light beam 11b (primary beam), and is visually recognized by the driver as an image 11c (virtual image) in front of the front windshield 20.

Moreover, a part of light beam 12a emitted from the light source 10 of HUD enters an interior from the interior surface 21 of the front windshield 20 of the vehicle, and is refracted. A part thereof is reflected on an exterior surface 22. Then, furthermore, the part thereof emerges from the interior surface 21 to the outside of the front windshield 20 of the vehicle by refraction, and guided to the eye 30 of the driver as a light beam 12b (secondary beam), and is visually recognized by the driver as an image 12c (virtual image). Note that a thickness of the front windshield 20 is constant, and the interior surface and the exterior surface are parallel to each other.

In this way, the two images 11c and 12c visually recognized by the driver are reflected double images. Moreover, an angle between the light beam 11b (primary beam) and the light beam 12b (secondary beam) is an angle $\alpha$ of the reflected double image. The angle $\alpha$ of the reflected double image is preferably close to zero. In the present application, a reflected double image in the case where the secondary beam is viewed upwardly from the driver is defined as a positive value.

Moreover, as illustrated in FIG. 1B, a part of a light beam 41a fitted from a light source 40 enters an interior from the exterior surface 22 of the front windshield 20 of the vehicle and is refracted. Then, a part thereof emerges to the outside of the front windshield 20 from the interior surface 21, and guided to the eye 30 of the driver as a light beam 41b, and visually recognized fey the driver as an image 41c.

Moreover, a part of a light beam 42a emitted from the light source 40 enters an interior from the exterior surface 22 of the front windshield 20 of the vehicle and is refracted. A part thereof is reflected on the interior surface 21. Then, furthermore, the part thereof is on the exterior surface 22, and furthermore a part thereof is refracted and emerges to the outside of the front windshield 20 from the interior surface 21 by refraction, and guided to the eye 30 of the driver as a light beam 42b, and visually recognized by the driver as an image 42c.

In this way, the two images 41c and 42c visually recognized by the driver are transmitted double images. Moreover, an angle between the light beam 41b (primary beam), and the light beam 42b (secondary beam) is an angle $\eta$ of the transmitted double image. The angle $\eta$ of the transmitted double image is preferably close to zero.

[Front Windshield (Laminated Glass)]

Figure 2A:
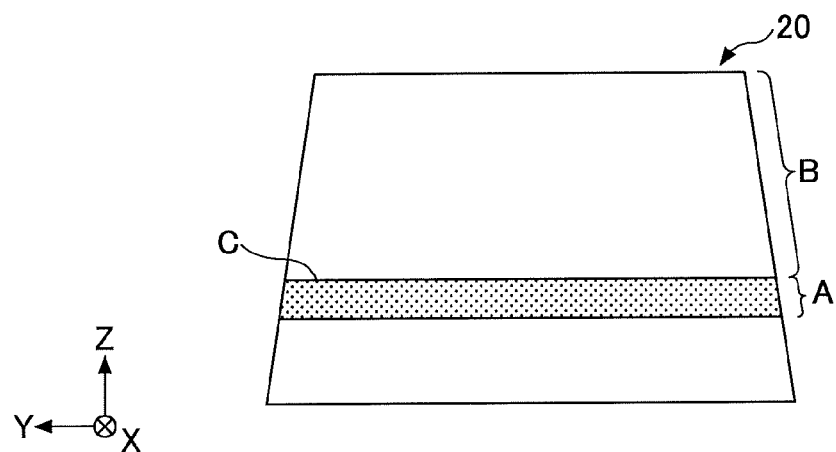
FIGS. 2A and 2B are diagrams for explaining a front windshield for a vehicle.
Figure 2B:
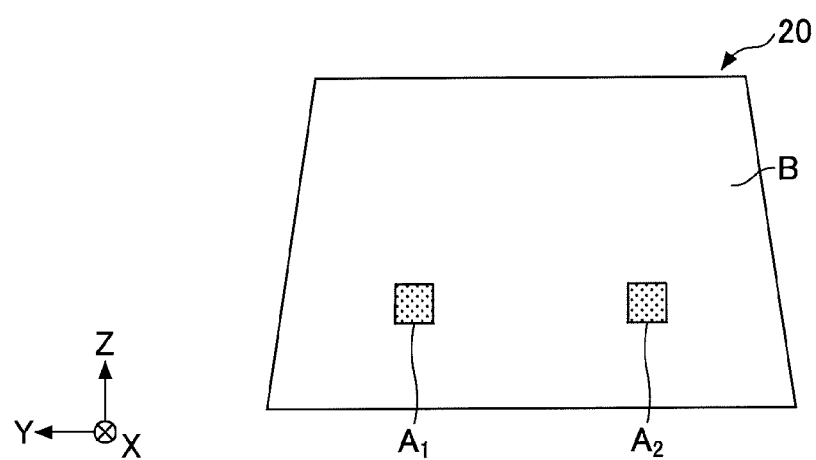
Figure 3A:
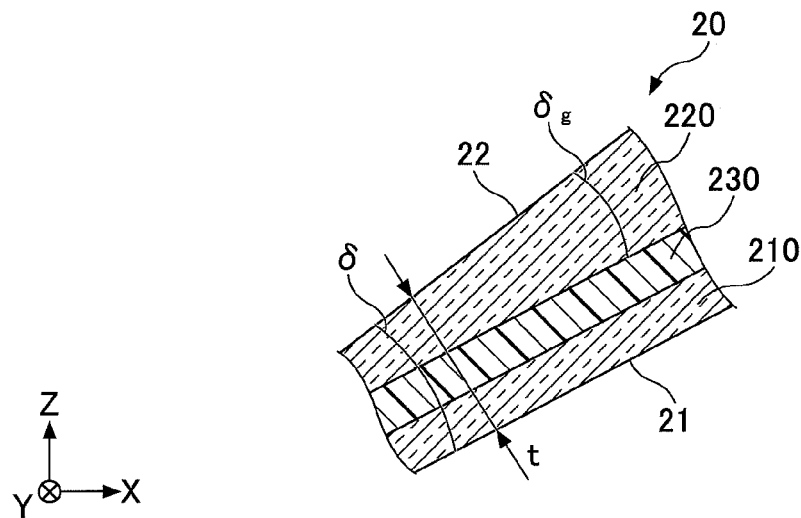
FIGS. 3A and 3B are partial cross-sectional diagrams depicting the front windshield illustrated in FIGS. 2A and 2B, cut so as to be parallel to a XZ-plane.
Figure 3B:
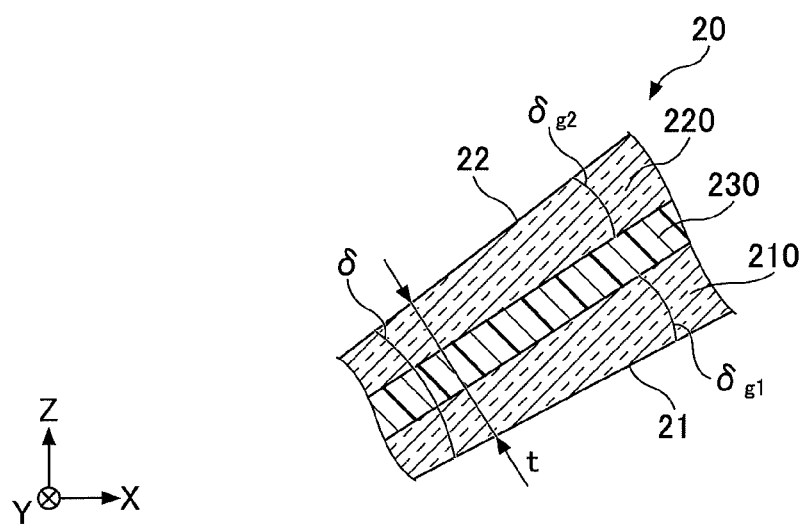

FIGS. 2A and 2B are diagrams depicting a front windshield of a vehicle, and schematically a state in which the front windshield is visually recognized from a vehicle front. Moreover, FIGS. 3A and 3B are partial cross-sectional diagrams depicting the front windshield illustrated in FIGS. 2A and 2B, cut so as to be parallel to the XZ-plane. Note that in FIGS. 2A and 2B, as a matter of convenience, a HUD display area is indicated by a dotted pattern.

As illustrated in FIG. 2A, the front windshield 20 includes an HUD display area A used for the HUD and an area outside the HUD display area B (transparent area) that is not used for the HUD. The HUD display area A is located in a lower part of the front windshield 20, and the area outside the HUD display area B is located adjacent to the HUD display area A and above the HUD display area A in the front windshield 20. A line indicated by C represents a boundary between the HUD display area A and the area outside the HUD display area B. However, the HUD display area may be arranged separated into a plurality of areas, such as an HUD display area $A_1$ and an HUD display area $A_2$, illustrated in FIG. 2B. Alternatively, the HUD display area may be only either one of the HUD display area $A_1$ and the HUD display area $A_2$. Note that the HUD display areas A, $A_1$ and $A_2$ are representative examples of the area used in the head up display according to the present invention.

As illustrated in FIG. 3A, the front windshield 20 is a laminated glass provided with a glass plate 210 that is a first glass plate, a glass plate 220 that is a second glass plate, and an intermediate film 230.

In the laminated glass, the glass plate 210 is a glass plate with a constant thickness having lines generated by drawing upon manufacturing. By contrast, in the glass plate 220, a thickness changes from one end toward the other opposite end, and the glass plate 220 has lines generated by drawing upon manufacturing. The intermediate film 230 is located between the glass plate 210 and the glass plate 220. The intermediate film 230 is a film with a constant thickness that bonds the glass plate 210 and the glass plate 220 so that the lines of the glass plate 210 are orthogonal to the lines of the glass plate 220.

In this way, the glass plate 220 is formed having a shape of wedge in a cross-sectional view. In the glass plate 220, an angle between a surface that is to be an exterior surface 22 of the front windshield 20 and a surface that contacts the intermediate film 230 will be referred to as a wedge angle $\delta g$. Note that in FIG. 3A, because thicknesses of the glass plate 210 and the intermediate film 230 are uniform, the wedge angle $\delta g$ of the glass plate 220 is the same as a wedge angle $\delta$ between the interior surface 21 and the exterior surface 22 of the front windshield 20 (a wedge angle of the entire laminated glass).

The glass plate 220 is designed so that the wedge angle $\delta g$ of the glass plate 220, which is equal to the wedge angle $\delta$, decreases in accordance with the Z+ direction in the HUD display area that is illustrated in FIG. 2A or FIG. 2B (from the lower position to the upper position, in the HUD display area). By designing in this way, a reflected double image is more controllable than the conventional front windshield even in the case where a concave mirror is rotated in accordance with the vertical motion of the position of the driver's eye point. The process will be described later in detail.

Moreover, the interior surface 21 of the front windshield 20 that is one surface of the glass plate 210 and the exterior surface 22 of the front windshield 20 that is one surface of the glass plate 220 may be flat surfaces or may be curved surfaces. The front windshield 20 may have, for example, a shape that is curved in the vertical direction. Note that t indicates a local thickness of the front windshield 20 (a total thickness of thicknesses of the glass plate 210, the glass plate 220 and the intermediate film 230 at the part).

A glass plate, in which a thickness changes from one end toward the other opposite end, such as the glass plate 220, can be obtained by devising a condition upon manufacturing by using the float method. That is, by controlling circumferential velocities of a plurality of rolls arranged on both ends of a glass ribbon that moves on a melted metal, a cross section of a glass in a width direction may be a concave shape, a convex shape, or a tapered shape, and a part that has a desired thickness change may be cut out.

In FIG. 3A, for the glass plate 210, a glass plate manufactured by using the float method in the same way as the glass plate 220 but with a constant thickness is used. However, as illustrated in FIG. 3B, the glass plate 210 may have a shape of wedge in a cross-sectional view, in which the thickness changes from one end toward the other opposite end. In this case, a sum of the wedge angle $\delta g_1$ of the glass plate 210 and the wedge angle $\delta g_2$ of the glass plate 220 is a wedge angle $\delta g$ of the entire glass plate. When the thickness of the intermediate film 230 is uniform, the wedge angle $\delta g$ of the entire glass plate is the same as a wedge angle between the interior surface 21 and the exterior surface 22 of the front windshield 20 (wedge angle of the entire laminated glass). Note that the wedge angle $\delta g_1$ of the glass plate 210 may be the same as the wedge angle $\delta g_2$ of the glass or may be different the wedge angle $\delta g_2$.

Moreover, in FIG. 3A and FIG. 3B, the thickness of the intermediate film 230 is assumed to be constant. But, the thicknesses of the glass plate 210 and the glass plate 220 may be constant and the intermediate film may have a shape of wedge in a cross-sectional view. However, it is necessary to note that in the case of forming the intermediate film 230, which configures the laminated glass, so as to have a shape of wedge in a cross-sectional view, because the intermediate film is configured of a quite soft material, the wedge angle is liable to be changed. Because the wedge angle of the intermediate film is changed, for example, when the intermediate film expands, and also changed by the effects of humidity, temperature or the like, it is difficult to control a condition for the wedge angle.

In the case where a change in the wedge angle of the intermediate film is a concern, the thickness of the intermediate film is preferably set constant, and either of or both the glass plates preferably have a shape of wedge in a cross-sectional view. Alternatively, a main part or the wedge angle of the front windshield may be achieved by either of or both the glass plates, and a part of the wedge angle may be achieved by the intermediate film.

Note that even when any of the glass plates and the intermediate film is made to have a shape of wedge in a cross-sectional view, the wedge angle $\delta$ of the entire laminated glass is designed to decrease in accordance with the Z+ direction in the HUD display area that is illustrated in FIG. 2A or FIG. 2B (from the lower position to the upper position in the HUD display area).

The glass plates 210 and 220 include streak-shaped fine irregularities (lines) parallel with respect to the moving direction, by an extension upon manufacturing by using the float method, respectively. Upon using as a front windshield for a vehicle, when the lines are viewed in the horizontal direction with respect to a line of sight of an observer, a distortion occurs and visibility degrades.

As the intermediate film 230 for bonding the glass plate 210 and the glass plate 220, a thermoplastic resin is often used, including a thermoplastic resin that has been used conventionally for this kind of purpose, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, or an ethylene-ethyl acrylate copolymer resin.

Among the above-described resins, a plasticized polyvinyl acetal resin is preferably used, because of its excellence in balance of performances, such as transparency, weather resistance, strength, bond strength, resistance to penetration, absorbability for impact energy, humidity resistance, thermal insulating property, and sound insulating property. The thermoplastic resin may be used independently, or two kinds or more resins may be used concurrently. The term "plasticized" in the plasticized polyvinyl acetal resin means that the resin is made plasticized by adding a plasticizing agent. The same applies to the other plasticized resins.

The polyvinyl acetal resin includes a polyvinyl formal resin that is obtained by reacting a polyvinyl alcohol (in the following, may be referred to as "PVA" as necessary) and a formaldehyde, a narrowly defined polyvinyl acetal resin that is obtained by reacting a PVA and an acetaldehyde, a polyvinyl butyral resin (in the following, may be referred to as "PVB" as necessary) that is obtained by reacting a PVA and a n-butyl aldehyde, and the like. Especially, a PVB is preferable, because of its excellence in balance of performances, such as transparency, weather resistance, strength, bond strength, resistance to penetration, absorbability for impact energy, humidity resistance, thermal insulating property, and sound insulating property. The polyvinyl acetal resin may be used independently, or two kinds or more resins may be used concurrently.

Normally, a light source for HUD is located in a lower part of the vehicle interior, and projects an image toward the laminated glass. Because the projected image is reflected on the rear surface and the front surface of the glass plate, in order to overlay both the reflected images, the thickness of the glass is required to vary in parallel with respect to the projection direction. Because the thickness of the glass plate 210 varies in a direction orthogonal to the lines, in order to be used as a glass, on which information is projected, the direction of the lines is orthogonal to the projection direction, i.e. the lines are parallel with a line of sight of an observer inside the vehicle interior, and thus in a direction in which the visibility degrades.

In order to improve the visibility, the laminated glass prepared using the glass plate 210, the glass plate 220, and the intermediate film 230 are preferably arranged so that the lines of the glass plate 210 are orthogonal to the lines of the glass plate 220. According to the above-described arrangement, the distortion, which deteriorates with use of the glass plate 210 only, will be reduced by the presence of the glass plate 220, in which the lines are orthogonal to the glass plate 210, along with the intermediate film 230 that bonds the glass plate 210 and the glass prate 220; and, the visibility is improved.

Furthermore, glasses for vehicle are normally used in a state of a curved shape. The shape formation of glass plates is generally performed, before the respective glass plates adhere via the intermediate film 230 to each other, by heating at a temperature of about 550° C. to 700° C., at which a glass becomes soft, in a shape as desired. An extent of curvature is denoted as a maximum depth of curvature, or a cross-curvature. Here, the maximum depth of curvature (cross-curvature) is a distance from a line that connects midpoints of opposite sides of the laminated glass, among the longer of the two pairs of opposite sides, to the deepest point of the curved portion, in a direction orthogonal to the line (in units of mm) where the convexly curved laminated glass is oriented so that one convex portion side directs downward.

Because streak-shaped fine irregularities occurring on a surface, which will cause a distortion when a laminated glass is formed, are expanded by a shape formation process, the greater the maximum depth of curvature (cross-curvature) is the more visibility is improved. The maximum depths of curvature of the glass plates 210 and the glass plates 220 according to the present invention are not necessarily limited, but are preferably 10 mm or more, more preferably 12 mm or more, and further preferably 15 mm or more.

PRACTICAL EXAMPLES

In practical examples, for general HUD optical systems, preferable wedge angle profiles, in which reflected double images are more controllable than the conventional art even in the case where concave mirrors are rotated in accordance with vertical motions of positions of the driver's eye points, was studied.

(Study 1)

In study 1, first a laminated glass, in which a wedge angle δ in a Z-direction of a HUD display area changed, was studied (practical example). Here, as illustrated in FIG. 3A, a glass plate 220 was assumed to be a wedged glass, and a glass plate 210 and an intermediate film 230 were assumed to have uniform thicknesses. That is, a wedge angle δg of the glass plate 220 is equal to a wedge angle δ of the laminated glass.

Figure 4:
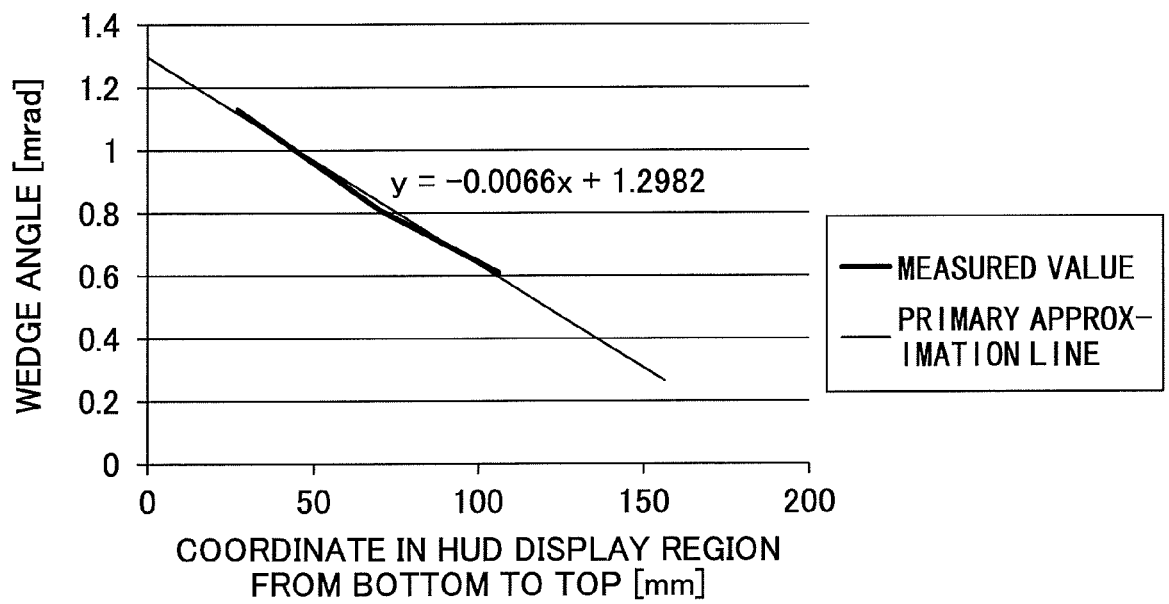
FIG. 4 is a diagram depicting a wedge angle profile of a laminated glass according to practical examples.

As illustrated in FIG. 4, in the laminated glass, the wedge angle δ decreases in accordance with the direction in the HUD display area. For example, the wedge angle δ is about 1.13 mrad (milliradian) at a position of about 27 mm from the lower edge of the HUD display area to the upper edge, the wedge angle δ is about 0.81 mrad at a position of about 70 mm from the lower edge of the HUD display area to the upper edge, and the wedge angle δ is about 0.61 mrad at a position of about 106 mm from the lower edge of the HUD display area to the upper edge. Note that a thick line represents measured values, and a thin line represents a primary approximation line.

Next, a variation of a reflected double image in a Z-direction (See FIGS. 2A and 2B) of the laminated glass according to the practical example was simulated. At this time, as a comparative example 1, a simulation was performed with a typical film, i.e. a wedge angle of the laminated glass is zero, and as a comparative example 2, a simulation was performed with a constant wedge, i.e. a wedge angle of the laminated glass is constant. Wedge angle profiles of the laminated glass according to the practical example and of the laminated glasses according to the comparative examples 1 and 2 are shown in FIG. 5 and TABLE 1.

TABLE 1

| position in Z-direction [mm] | wedge angle according to practical example [mrad] | wedge angle of typical film (comparative example 1) [mrad] | wedge angle of constant wedge (comparative example 2) [mrad] |
| --- | --- | --- | --- |
| 145 | 0.32 | 0.00 | 0.81 |
| 70 | 0.81 | 0.00 | 0.81 |
| 0 | 1.27 | 0.00 | 0.81 |

Figure 5:
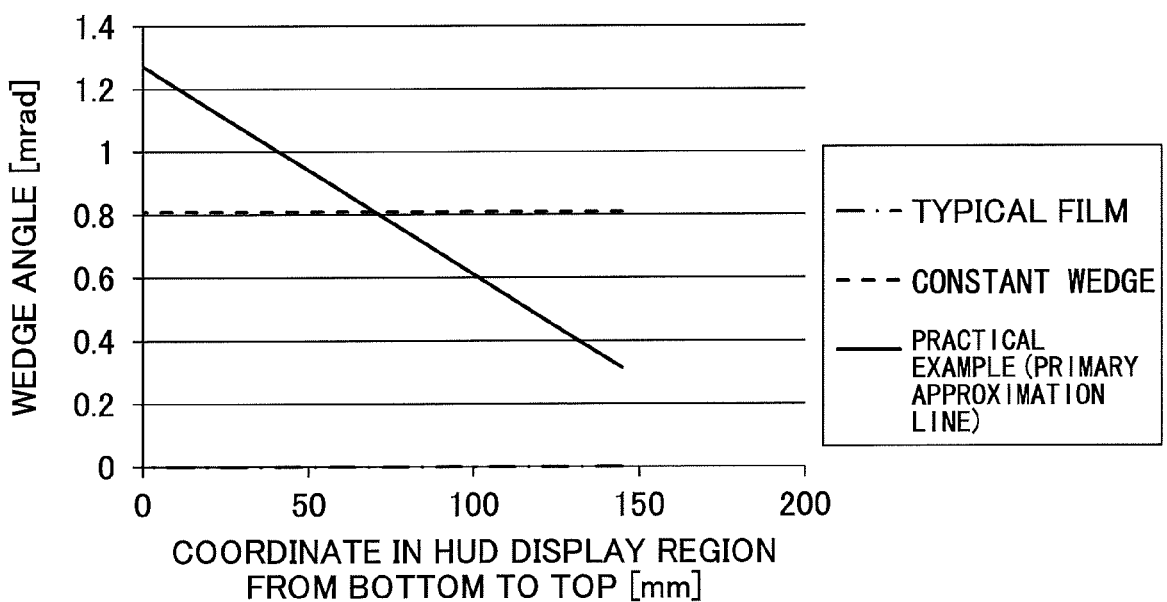
FIG. 5 is a diagram depicting wedge angle profiles of laminated glasses according to the practical examples and comparative examples (part 1)

As shown in FIG. 5 and TABLE 1, in the laminated glass according to the practical example, in accordance with the Z+ direction in the HUD display area, the wedge angle decreases at a rate of about 0.66 mrad/100 mm. Moreover, in the typical film according to the comparative example 1, irrespective of a position in the Z+ direction in the HUD display area, the wedge angle of the laminated glass is 0 mrad. Furthermore, in the constant wedge according to the comparative example 2, irrespective of a position in the Z+ direction in the HUD display area, the wedge angle of the laminated glass is 0.81 mrad.

Figure 6:
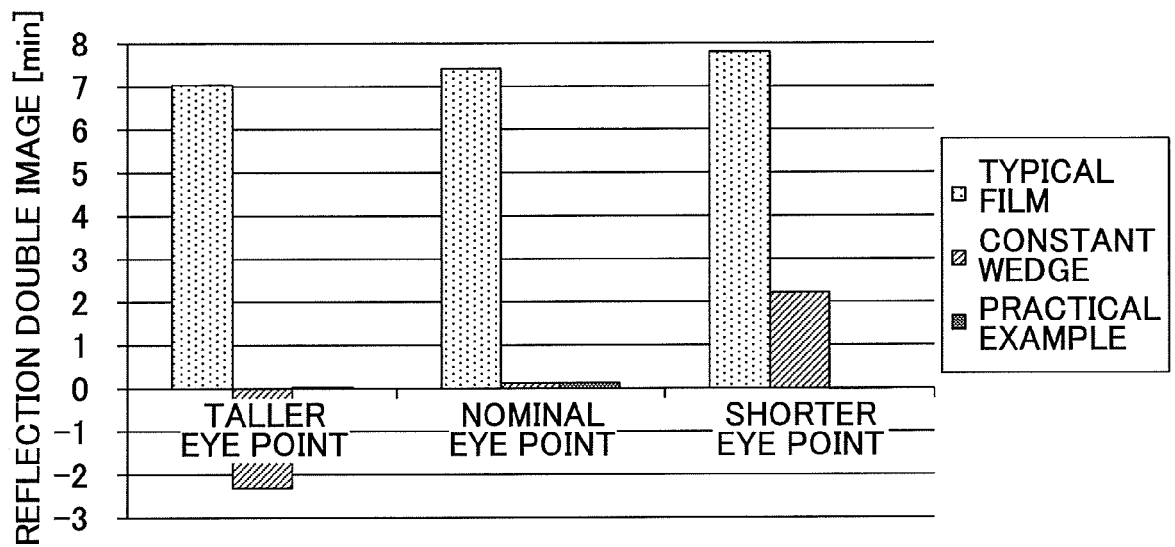
FIG. 6 is a diagram depicting a result of calculation for reflected double images of the laminated glasses according to the practical examples and the comparative examples (part 1)

Results of calculation for reflected double images are shown in FIG. 6 and TABLE 2. Note that a "shorter" eye point of a driver, in FIG. 6 and TABLE 2, indicates the case where the driver sees a beam reflected at around the lower edge (around a position of about 27 mm) of the HUD display area, a "nominal" eye point of the driver indicates the case where the driver sees a beam reflected at around a center (around a position of about 70 mm) of the HUD display area, and a "taller" eye point at the driver indicates the case where the driver sees a beam reflected at around the upper edge (around a position of about 106 mm) of the HUD display area.

TABLE 2

| eye point of driver | reflected double image according to practical example [minute] | reflected double image according to typical film (comparative example 1) [minute] | reflected double image according to constant wedge (comparative example 2) [minute] |
| --- | --- | --- | --- |
| taller | 0.03 | 7.03 | −2.31 |
| nominal | 0.12 | 7.41 | 0.12 |
| shorter | −0.01 | 7.80 | 2.21 |

Here, a tolerance level for the reflected double image is preferably ±2.1 minutes or less, more preferably ±1.8 minutes or less, and further preferably ±1.4 minutes or less.

The aforementioned values are based on the results of analysis from an eye point of a feeling of discomfort in visual observation and a resolution in the visual observation. The tolerance level of ±2.1 minutes or less is a level at which a driver does not feel discomfort in visual observation. If the tolerance level is ±1.8 minutes or less, there is almost no problem in the market. The tolerance level of ±1.4 minutes or less is less than a resolution of the lowest visual acuity of 0.1, required for a regular car license, and a risk to cause a problem is further reduced.

As shown in FIG. 6 and TABLE 2, for the typical film, even in the case of the "shorter" eye point, the reflected double image is large. As the eye point of the driver moves from the "nominal" eye point to the "taller" eye point, the reflected double image further grows. For the typical film, in any case of the "shorter" eye point, the "nominal" eye point, and the "taller" eye point of the driver, the reflected double images highly exceed the tolerance level of ±2.1 minutes.

Moreover, for the constant wedge, different from the typical film, in the case of the "nominal" eye point of the driver, the reflected double image decreases to a level at which there is not a problem at all. However, in the case of the "shorter" eye point or the "taller" eye point of the driver, the reflected double image is greater than that of the "nominal" eye point, and exceeds the tolerance level of ±2.1 minutes.

In contrast, in the practical example, in any case of the "shorter" eye point, the "nominal" eye point, and the "taller"

eye point of the driver, the reflected double image is 0.12 minutes or less, which sufficiently satisfies the conditions of the tolerance level of the reflected double image, i.e. ±2.1 minutes or less, ±1.8 minutes or less, or ±1.4 minutes or less.

(Study 2)

In Study 2, a change in the reflected double image was calculated in the case where the inclination of the change in the wedge angle was varied based on the results of Study 1. The wedge profile is shown in FIG. 1 and TABLE 3. Note that in TABLE 3, a unit of a wedge angle is mrad.

TABLE 3

| position in Z-direction [mm] | 0.06 mrad/ 100 mm | 0.1 mrad/ 100 mm | 0.2 mrad/ 100 mm | 0.3 mrad/ 100 mm | 0.7 mrad/ 100 mm | 0.8 mrad/ 100 mm | 0.9 mrad/ 100 mm | 1.0 mrad/ 100 mm | 1.1 mrad/ 100 mm |
|---|---|---|---|---|---|---|---|---|---|
| 145 | 0.788 | 0.735 | 0.66 | 0.585 | 0.285 | 0.21 | 0.135 | 0.06 | 0.41 |
| 70 | 0.81 | 0.81 | 0.81 | 0.81 | 0.81 | 0.81 | 0.81 | 0.81 | 0.81 |
| 0 | 0.836 | 0.88 | 0.95 | 1.02 | 1.3 | 1.37 | 1.44 | 1.51 | 1.28 |

Figure 7:
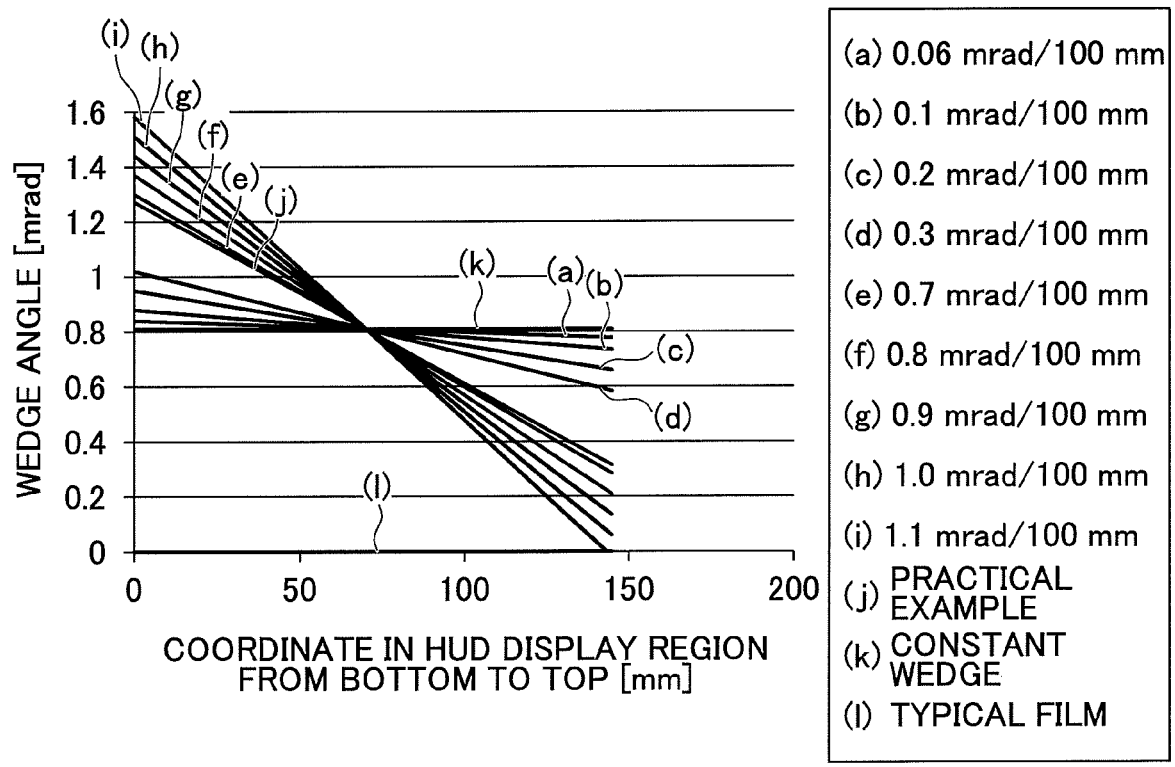
FIG. 7 is a diagram depicting wedge angle profiles of the laminated glasses according to the practical examples and the comparative examples (part 2)

As shown in FIG. 7 and TABLE 3, nine wedge angle profiles having the inclinations of 0.06 mrad/100 mm, 0.1 mrad/100 mm, 0.2 mrad/100 mm, 0.3 mrad/100 mm, 0.7 mrad/100 mm, 0.8 mrad/100 mm, 0.9 mrad/100 mm, 1.0 mrad/100 mm and 1.1 mrad/100 mm were added to the typical film, the constant wedge, and the practical examples, respectively.

Figure 8:
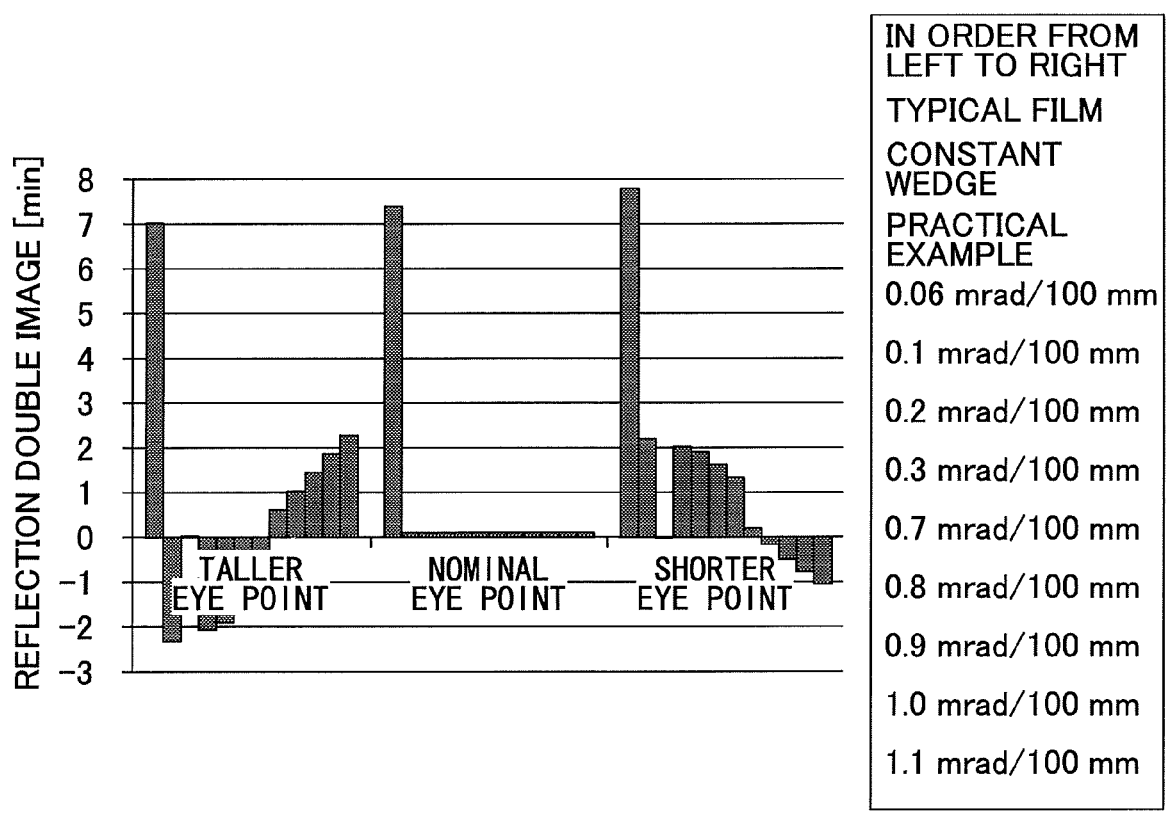
FIG. 8 is a diagram depicting the results of calculation for reflected double images of the laminated glasses according to the practical examples and the comparative examples (part 2).

Results of calculations for the reflected double image based on the wedge angle profiles, shown in FIG. 7 and TABLE 3, are shown in FIG. 8 and TABLE 4. Note that in TABLE 4, a unit of the reflected double image is minute.

TABLE 4

| eye point of driver | 0.06 mrad/ 100 mm | 0.1 mrad/ 100 mm | 0.2 mrad/ 100 mm | 0.3 mrad/ 100 mm | 0.7 mrad/ 100 mm | 0.8 mrad/ 100 mm | 0.9 mrad/ 100 mm | 1.0 mrad/ 100 mm | 1.1 mrad/ 100 mm |
|---|---|---|---|---|---|---|---|---|---|
| taller | −2.06 | −1.90 | −1.49 | −1.07 | 0.62 | 1.03 | 1.45 | 1.86 | 2.28 |
| nominal | 0.12 | 0.12 | 0.12 | 0.12 | 0.12 | 0.12 | 0.12 | 0.12 | 0.12 |
| shorter | 2.03 | 1.92 | 1.62 | 1.33 | 0.20 | −0.15 | −0.49 | −0.76 | −1.05 |

From FIG. 8 and TABLE 4, it is found that the wedge angle profile is required to fall within a range of 0.06 mrad/100 mm to 1.0 mrad/100 mm, in order to keep the reflected double image to ±2.1 minute or less. Moreover, it is found that the wedge angle profile is required to fall within a range of 0.2 mrad/100 mm to 0.9 mrad/100 mm, in order to keep the reflected double image to ±1.8 minute or less. Moreover, it is found that the wedge angle profile is required to fall within a range of 0.3 mrad/100 mm to 0.8 mrad/100 mm, in order to keep the reflected double image to ±1.4 minute or less.

(Summary of Studies 1 and 2)

From the aforementioned results of studies, it is found impossible to control the reflected double image to fall within the range of the tolerance level with the typical film. Moreover, with the constant wedge, in the case of the "nominal" eye point of the driver, it is found to be possible to control the reflected double image to fall within the range of the tolerance level. However, in the case of the "shorter" eye point or the "taller" eye point of the driver, it is found to be impossible to control the reflected double image to fall within the range of the tolerance level. That is, with the constant wedge, even if a proper wedge angle is selected so that the reflected double image can be controlled in the case of the "nominal" eye point of the driver, the reflected double image cannot be controlled to fall within the range of the tolerance level in the case where the concave mirror of the HUD is rotated in accordance with the vertical motion of the driver's eye point.

In contrast, when the laminated glass is designed so that the wedge angle of the laminated glass decreases in accordance with the direction in the HUD display area, i.e. going from the lower edge to the upper edge of the HUD display area, even if the concave mirror of the HUD is rotated in accordance with the vertical motion of the driver's eye point, the reflected double image can be better controlled than the conventional art.

A preferable wedge angle profile at this time a profile decreasing at a rate that falls within a range of 0.06 mrad or more and 1.0 mrad or less per 100 mm in accordance with a direction from the lower edge to the upper edge of the HUD display area. According to the above-described configuration even it the concave mirror of the HUD is rotated in accordance with the vertical motion of the driver's eye point, the reflected double image can be controlled to ±2.1 minutes or less, which is the range of tolerance level.

Moreover, a more preferable wedge angle profile is a profile decreasing at a rate that falls within a range of 0.2 mrad or more and 0.9 mrad or less per 100 mm in accordance with a direction from the lower edge to the upper edge of the HUD display area. According to the above-described configuration, even if the concave mirror of the HUD is rotated in accordance with the vertical motion of the driver's eye point, the reflected double image can be controlled to ±1.8 minutes or less, that is the range of tolerance level.

Moreover, a further preferable wedge angle profile is a profile decreasing at a rate that falls within a range of 0.3 mrad or more and 0.8 mrad or less per 100 mm in accordance with a direction from the lower edge to the upper edge of the HUD display area. According to the above-described configuration, even if the concave mirror of the HUD is rotated in accordance with the vertical motion of the driver's eye point, the reflected double image can be controlled to ±1.4 minutes or less, that is the range of tolerance level.

However, it is not necessary to decrease the wedge angle going from the lower edge to the upper edge over an entire area of the HUD display area. It is enough to decrease the wedge angle going from the lower edge to the upper edge within a prescribed area of at least a part of the HUD display area. Specifically, if the wedge angle is decreased going from the lower edge to the upper edge, within a prescribed area that occupies 30% or more of the HUD display area divided in the vertical direction, the reflected double image is more controllable than the conventional art. The above-described configuration was derived by the inventors of the present application from results of studies for a positional relationship of an area on a glass, on which an emitted light from a light source was reflected, when an eye point moves and for respective cases of eye points, for a plurality of types of vehicles. It is obvious that the wedge angle may be decreased in accordance with a direction from the lower-edge to the upper edge over an entire area of the HUD display area.

Moreover, at the upper end of the HUD display area, the wedge angle is preferably changed (decreased). According to the above-described configuration, a transmitted double image in an area above the HUD display area can be made small.

As described above, the preferred embodiments and the like have been described in detail. However, the present invention is not limited to the above-described specific embodiments, but various variations and modifications may be made without deviating from the scope of the present invention.

For example, in the aforementioned example, a linear wedge angle profile was exemplified. But the wedge angle profile may not be linear. For example, within the HUD display area, the inclination may be 0.3 mrad/100 mm in one area and may be 0.5 mrad/100 mm in another area.

As described above, the laminated glass has been described with embodiments, practical examples and the like. However, the present invention is not limited to the aforementioned embodiments, practical examples and the like. Various variations and modifications may be made without departing from the scope of the present invention.

REFERENCE SIGNS LIST 10,40 light source
11a,11b,12a,12b,41a,41b,42a,42b beam
11c,12c,41c,42c image
20 front windshield
21 interior surface
22 exterior surface
30 eyes
210,220 glass plate
230 intermediate film
$A, A_1, A_2$ HUD display area
B area outside HUD display area
C boundary

What is claimed is:

1. A front windshield, comprising:
a laminated glass comprising a first glass plate, a second glass plate, and an intermediate film positioned between the first glass plate and the second glass plate and bonding the first glass plate and the second glass plate,
wherein the laminated glass has an HUD display area configured to be used by a head-up display and including an area formed such that a wedge angle of the laminated glass decreases in a direction from a lower edge of the area to an upper edge of the area at a rate in a range of from 0.1 mrad to 1.0 mrad per 100 mm and that a tolerance level of a reflected double image is less than +/−2.03 min.

2. The front windshield according to claim 1, wherein the wedge angle of the laminated glass in the area decreases in the direction from the lower edge of the area to the upper edge of the area at a rate in a range of from 0.2 mrad to 0.9 mrad per 100 mm and that a tolerance level of a reflected double image is less than +/−1.80 min.

3. The front windshield according to claim 1, wherein the wedge angle of the laminated glass in the area decreases in the direction from the lower edge of the area to the upper edge of the area at a rate in a range of from 0.3 mrad to 0.8 mrad per 100 mm and that a tolerance level of a reflected double image is less than +/−1.40 min.

4. The front windshield according to claim 1, wherein at least one of the first glass plate and the second glass plate has a thickness that changes from the lower edge of the area to the upper edge of the area such that the wedge angle of the laminated glass decreases in the direction from the lower edge of the area to the upper edge of the area at the rate in the range of from 0.1 mrad to 1.0 mrad per 100 mm and that the tolerance level of a reflected double image is less than +/−2.03 min.

5. The front windshield according to claim 1, wherein the area occupies 30% or more of the HUD display area divided in a vertical direction.

6. The front windshield according to claim 4, wherein the wedge angle of the laminated glass in the area decreases in the direction from the lower edge of the area to the upper edge of the area at a rate in a range of from 0.2 mrad to 0.9 mrad per 100 mm and that a tolerance level of a reflected double image is less than +/−1.80 min.

7. The front windshield according to claim 4, wherein the wedge angle of the laminated glass in the area decreases in the direction from the lower edge of the area to the upper edge of the area at a rate in a range of from 0.3 mrad to 0.8 mrad per 100 mm and that a tolerance level of a reflected double image is less than +/−1.40 min.

8. The front windshield according to claim 1, wherein the area occupies 30% or more of the HUD display area divided in a vertical direction.

9. The front windshield according to claim 1, wherein the intermediate film has a constant thickness in the direction from the lower edge of the area to the upper edge of the area.

10. The front windshield according to claim 4, wherein the intermediate film has a constant thickness in the direction from the lower edge of the area to the upper edge of the area.

11. The front windshield according to claim 1, wherein one of the first glass plate and the second glass plate has a thickness that changes from the lower edge of the area to the upper edge of the area such that the wedge angle of the laminated glass decreases in the direction from the lower edge of the area to the upper edge of the area at the rate in the range of from 0.1 mrad to 1.0 mrad per 100 mm and that the tolerance level of a reflected double image is less than +/−2.03 min.

12. The front windshield according to claim 11, wherein the wedge angle of the laminated glass in the area decreases in the direction from the lower edge of the area to the upper edge of the area at a rate in a range of from 0.2 mrad to 0.9 mrad per 100 mm and that a tolerance level of a reflected double image is less than +/−1.80 min.

13. The front windshield according to claim 11, wherein the wedge angle of the laminated glass in the area decreases in the direction from the lower edge of the area to the upper edge of the area at a rate in a range of from 0.3 mrad to 0.8 mrad per 100 mm and that a tolerance level of a reflected double image is less than +/−1.40 min.

14. The front windshield according to claim 11, wherein the area occupies 30% or more of the HUD display area divided in a vertical direction.

15. The front windshield according to claim 11, wherein the intermediate film has a constant thickness in the direction from the lower edge of the area to the upper edge of the area.

16. The front windshield according to claim 1, wherein the first glass plate and the second glass plate have thicknesses that change from the lower edge of the area to the upper edge of the area such that the wedge angle of the laminated glass decreases in the direction from the lower edge of the area to the upper edge of the area at the rate in the range of from 0.1 mrad to 1.0 mrad per 100 mm and that the tolerance level of a reflected double image is less than +/−2.03 min.

17. The front windshield according to claim 16, wherein the wedge angle of the laminated glass in the area decreases in the direction from the lower edge of the area to the upper edge of the area at a rate in a range of from 0.2 mrad to 0.9 mrad per 100 mm and that a tolerance level of a reflected double image is less than +/−1.80 min.

18. The front windshield according to claim 16, wherein the wedge angle of the laminated glass in the area decreases in the direction from the lower edge of the area to the upper edge of the area at a rate in a range of from 0.3 mrad to 0.8 mrad per 100 mm and that a tolerance level of a reflected double image is less than +/−1.40 min.

19. The front windshield according to claim 16, wherein the area occupies 30% or more of the HUD display area divided in a vertical direction.

20. The front windshield according to claim 16, wherein the intermediate film has a constant thickness in the direction from the lower edge of the area to the upper edge of the area.

* * * * *